(12) United States Patent
Kim et al.

(10) Patent No.: US 7,158,206 B2
(45) Date of Patent: Jan. 2, 2007

(54) SPUTTER FOR DEPOSITION OF METAL LAYER AND FABRICATING METHOD OF LIQUID CRYSTAL DISPLAY DEVICE USING THE SAME

(75) Inventors: Jeong-Rok Kim, Gyeongsangbuk-do (KR); Kyung-Kyu Kang, Gyeongsangnam-do (KR); Johann Jeong, Gyeongsangbuk-do (KR); Myung-Woo Nam, Gyeongsangbuk-do (KR); Jae-Deuk Shin, Busan (KR)

(73) Assignee: LG. Philips LCD Co., Ltd., Seoul (KR)

( * ) Notice: Subject to any disclaimer, the term of this patent is extended or adjusted under 35 U.S.C. 154(b) by 63 days.

(21) Appl. No.: 10/681,140

(22) Filed: Oct. 9, 2003

(65) Prior Publication Data

US 2004/0119916 A1     Jun. 24, 2004

(30) Foreign Application Priority Data

Dec. 30, 2002   (KR) ...................... 10-2002-0087409

(51) Int. Cl.
   G02F 1/1333   (2006.01)
   G02F 1/1335   (2006.01)
   G02F 1/1343   (2006.01)

(52) U.S. Cl. ...................... 349/187; 349/106; 349/110; 349/139; 204/192; 438/674

(58) Field of Classification Search ................ 349/187, 349/106, 110, 139; 428/137; 257/40; 204/192.29, 204/192; 438/674

See application file for complete search history.

(56) References Cited

U.S. PATENT DOCUMENTS 4,988,424 A * 1/1991 Woodward et al. .... 204/192.29
5,744,214 A * 4/1998 Berasi et al. ................ 428/137
5,824,197 A * 10/1998 Tanaka .................... 204/192.12
6,057,903 A * 5/2000 Colgan et al. .............. 349/139
6,362,097 B1 * 3/2002 Demaray et al. ........... 438/674
6,407,408 B1 * 6/2002 Zhou et al. .................... 257/40
6,461,485 B1 * 10/2002 Mizouchi et al. ...... 204/192.15
6,610,179 B1 * 8/2003 Baldwin et al. ....... 204/192.11
6,847,422 B1 * 1/2005 Zhang et al. ................ 349/106
6,951,596 B1 * 10/2005 Green et al. ................ 156/264

FOREIGN PATENT DOCUMENTS

JP       11-229132       *    8/1999

* cited by examiner

Primary Examiner—Huyen Ngo
(74) Attorney, Agent, or Firm—Birch, Stewart, Kolasch & Birch, LLP

(57) ABSTRACT

A fabricating method of a liquid crystal display device includes forming a gate line on a first substrate, forming a data line crossing the gate line, forming a switching element connected to the gate line and the data line, forming a pixel electrode connected to the switching element, forming a black matrix on a second substrate using a sputter, wherein the sputter includes a shield mask having an open portion larger than or equal to the second substrate, forming a color filter layer on the black matrix, forming a common electrode on the color filter layer, attaching the first and second substrates such that the pixel electrode faces the common electrode, and forming a liquid crystal layer between the pixel electrode and the common electrode.

36 Claims, 4 Drawing Sheets

SPUTTER FOR DEPOSITION OF METAL LAYER AND FABRICATING METHOD OF LIQUID CRYSTAL DISPLAY DEVICE USING THE SAME

This application claims the benefit of Korean Patent Application No. 2002-87409, filed on Dec. 30, 2002 in Korea, which is hereby incorporated by reference for all purposes as if fully set forth herein.

BACKGROUND OF THE INVENTION

1. Field of the Invention

The present invention relates to a liquid crystal display device, and more particularly, to a sputter for deposition of a metal layer for a liquid crystal display device, and a method of fabricating a liquid crystal display device using a sputter.

2. Discussion of the Background Art

Cathode ray tubes (CRTs) have been widely used for display devices such as televisions and monitors. However, the CRTs have several disadvantages, for example, they are heavy, they occupy a large volume, and they require a high driving voltage. Accordingly, flat panel display (FPD) devices such as thin-film transistor-liquid crystal displays (TFT-LCDs) are being developed, which have high resolution, small depth and high color reproducibility. Moreover, the TFT-LCDs have become larger.

FIG. 1 is a schematic perspective view of a liquid crystal display device according to the background art.

In FIG. 1, a liquid crystal display (LCD) device 11 has an upper substrate 5 and a lower substrate 22, which face one another, and which are spaced apart from each other. A liquid crystal layer 14 is interposed between the upper substrate 5 and the lower substrate 22. The upper substrate 5, which is commonly referred to as a color filter substrate, includes a black matrix 6, a color filter layer 7, and a transparent common electrode 18 subsequently disposed on an inner surface thereof. The black matrix 6 includes openings having one of three sub-color filters 7a, 7b and 7c of red (R), blue (B), and green (G), respectively.

A gate line 13 and a data line 15 are formed on an inner surface of the lower substrate 22, which is commonly referred to as an array substrate, such that the gate line 13 and the date line 15 cross each other to define a pixel region "P." A thin film transistor (TFT) "T" is formed at the intersection of the gate line 13 and the data line 15. A pixel electrode 17 is formed in the pixel region "P" to correspond to each of the sub-color filters 7a, 7b, and 7c, and is electrically connected to the TFT "T." The upper substrate 5, the lower substrate 22, and the liquid crystal layer 14 interposed therebetween are together referred to as a liquid crystal cell.

FIG. 2 is a schematic cross-sectional view of a liquid crystal display device according to the background art.

In FIG. 2, a first substrate 22 and a second substrate 5 face each other and are spaced apart from each other. A gate electrode 32 of a conductive material such as metal is formed on an inner surface of the first substrate 22. A gate insulating layer 34 of silicon nitride ($SiN_x$) or silicon dioxide ($SiO_2$) is formed on the gate electrode 32. An active layer 36 of amorphous silicon is formed on the gate insulating layer 34 over the gate electrode 32, and an ohmic contact layer 38 of impurity-doped amorphous silicon is formed on the active layer 36. Source and drain electrodes 42 and 44 of a conductive material such as metal are formed on the ohmic contact layer 38 to constitute a thin film transistor (TFT) "T" with the gate electrode 32. A passivation layer 46 of an inorganic insulating material or an organic insulating material is formed on the source and drain electrodes 42 and 44. The passivation layer 46 has a drain contact hole 46a exposing the drain electrode 44. A pixel electrode 17 of a transparent conductive material is formed on the passivation layer 46 in a pixel region. The pixel electrode 17 is connected to the drain electrode 44 through the drain contact hole 46a.

A black matrix 6 is formed on an inner surface of the second substrate 5. The black matrix 6 covers a boundary of the pixel electrode 17 to prevent light leakage at an area outside of the pixel electrode 17. The black matrix 6 also corresponds to the area of the TFT "T" to shield incident light into a channel of the TFT "T," thereby preventing generation of photocurrent. A color filter layer 7 including red and blue sub-color filters 7a and 7b is formed on the black matrix 6. Even though not shown in FIG. 2, red, green and blue sub-color filters are alternately repeated such that each sub-color filter corresponds to one pixel electrode 17. A common electrode 18 of a transparent conductive material is formed on the color filter layer 7. A liquid crystal layer 14 is formed between the pixel electrode 17 and the common electrode 18.

The gate electrode 32, the source and drain electrodes 42 and 44, the pixel electrode 17 and the black matrix 6 are usually made of a metallic material. In general, the metallic material is deposited in a sputter through a physical vapor deposition (PVD) method. For a black matrix of an LCD device, a fabricating process will be illustrated in detail.

In an LCD device, the sub-pixel regions of an upper substrate are divided by a black matrix as described above. The black matrix, which is sometimes referred to as a light shielding film, prevents mixing of the red, green and blue colors, and improves the contrast ratio. In addition, the black matrix prevents radiation of other sub-pixel regions by electrons, and minimizes reflection of incident light so that images having high resolution and high definition can be displayed. Moreover, the black matrix shields light from the backlight unit by the sub-pixel regions, thereby clarifying the color of each sub-pixel region.

The black matrix can be made of a conductive metallic material such as chromium (Cr) through a photolithographic process, or made of conductive graphite or organic polymeric resin having low reflectance. In the case of a conductive metallic material, even though accumulated electrons in the black matrix are easily eliminated, the black matrix has relatively high reflectance. Thus, an additional metal oxide may be formed on the metallic black matrix. For example, chromium (Cr) and chromium oxide (CrOx) may be used as the black matrix and the metal oxide, respectively. After Cr and CrOx films are formed on a substrate by sequentially depositing Cr and CrOx in a sputter, a photoresist (PR) film is formed on the Cr and CrOx films. After exposing and developing the PR film to form a PR pattern, the Cr and CrOx films are etched. A black matrix is completed by subsequent cleaning and removing of the PR pattern. Generally, nitric acid of about 4% including $Ce(NH_3)_2(NO_3)_6$ of about 10 weight % is, used as an etching solution for the etching process, and water of room temperature is used as a cleaning solution for the cleaning process.

FIG. 3 is a schematic view showing a structure of a sputter according to the background art.

A sputter is a deposition apparatus of a thin film using a sputtering phenomenon. In a chamber of the sputter, first ions such as argon ions (Ar+) are accelerated and collide with a target having a low voltage, whereby second ions of the target are detached and deposited onto a substrate. In FIG. 3, a sputter 100 includes a chamber 105. In the chamber 105, a substrate 110 is loaded on a susceptor 120. The susceptor 120 is formed on a platen 130 which is movable up and down to adjust a gap between the substrate 110 and a target 140 disposed over the substrate 110. A magnet 150 is formed outside the chamber 105 to increase plasma density by generating a magnetic field. A shield mask 160 having an open portion "H" is formed between the target 140 and the substrate 110. The shield mask 160 determines a deposition region of chromium (Cr) and chromium oxide (CrOx) onto the substrate 110.

FIG. 4 is a magnified schematic view, which is a portion "A" of FIG. 3, showing a shield mask according to the background art.

In FIG. 4, since a shield mask 160 has an open portion "H" (of FIG. 3) smaller than a substrate 110, the shield mask 160 overlaps an edge of the substrate 110 with an overlapping distance "d1", and the edge of the substrate 110 is screened by the shield mask 160 in an overlapping portion "C." Accordingly, chromium (Cr) and chromium oxide (CrOx) are not uniformly deposited onto the edge of the substrate 110, while they are uniformly deposited onto a central portion of the substrate 110 through the open portion "H." Since Cr and CrOx films have non-uniform thickness in the overlapping portion "C," the Cr and CrOx films of the overlapping portion "C" cannot be used for a black matrix. As an LCD device is enlarged, the demand for full utilization of a substrate increases. However, since an edge of a substrate cannot be used due to non-uniformity of thickness, utilization efficiency of the substrate is relatively low. These disadvantages not only affect the black matrix, but also affect the other metal layers formed by sputtering, such as the gate line including the gate electrode, the data line including source and drain electrodes, the pixel electrode, and the common electrode.

SUMMARY OF THE INVENTION

The present invention is directed to a sputter for deposition of a metal layer, which substantially obviates one or more of problems due to limitations and disadvantages of the background art.

An object of the present invention is to provide a sputter having an improved shield mask to enlarge an effective area of a metal layer for a black matrix, a gate line, a data line, a pixel electrode and a common electrode.

An advantage of the present invention is to provide a fabricating method of a liquid crystal display device that maximizes an efficiency of a substrate.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a fabricating method of a liquid crystal display device includes: forming a gate line on a first substrate; forming a data line crossing the gate line; forming a switching element connected to the gate line and the data line; forming a pixel electrode connected to the switching element; forming a black matrix on a second substrate using a sputter, wherein the sputter includes a shield mask having an open portion with dimensions larger than or equal to the dimensions of the second substrate; forming a color filter layer on the black matrix; forming a common electrode on the color filter layer; attaching the first and second substrates such that the pixel electrode faces into the common electrode; and forming a liquid crystal layer between the pixel electrode and the common electrode.

In another aspect, a sputter for a fabricating process of a liquid crystal display device includes: a chamber; a susceptor in the chamber, a substrate being loaded on the susceptor; a platen under the susceptor, the platen adjusting a height of the susceptor; a target over the susceptor; a magnet over the target; and a shield mask between the substrate and the target, the shield mask having an open portion with dimensions larger than or equal to the dimensions of the substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENT

Reference will now be made in detail to the illustrated embodiment of the present invention, which is illustrated in the accompanying drawings. Wherever possible, similar reference numbers will be used throughout the drawings to refer to the same or like parts.

Figure 1:
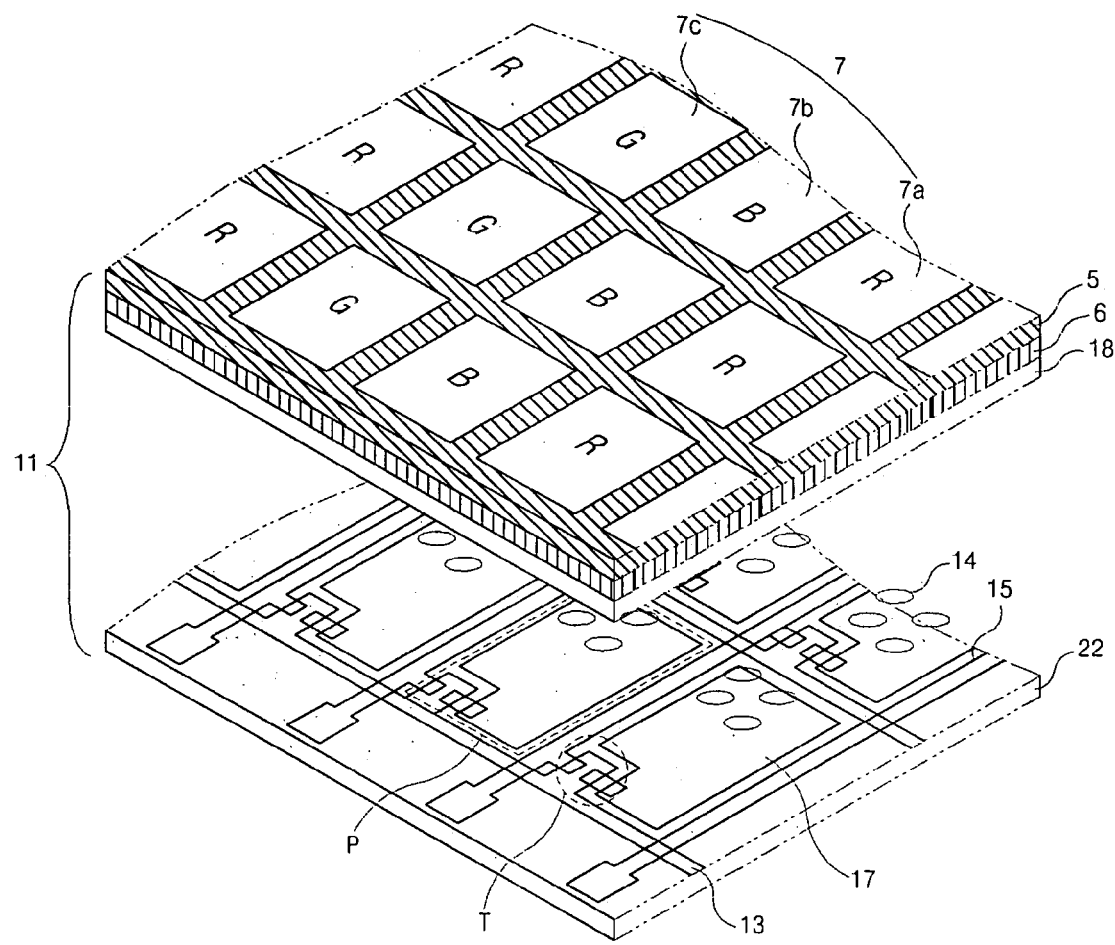
FIG. 1 is a schematic perspective view of a liquid crystal display device according to the background art.
Figure 2:
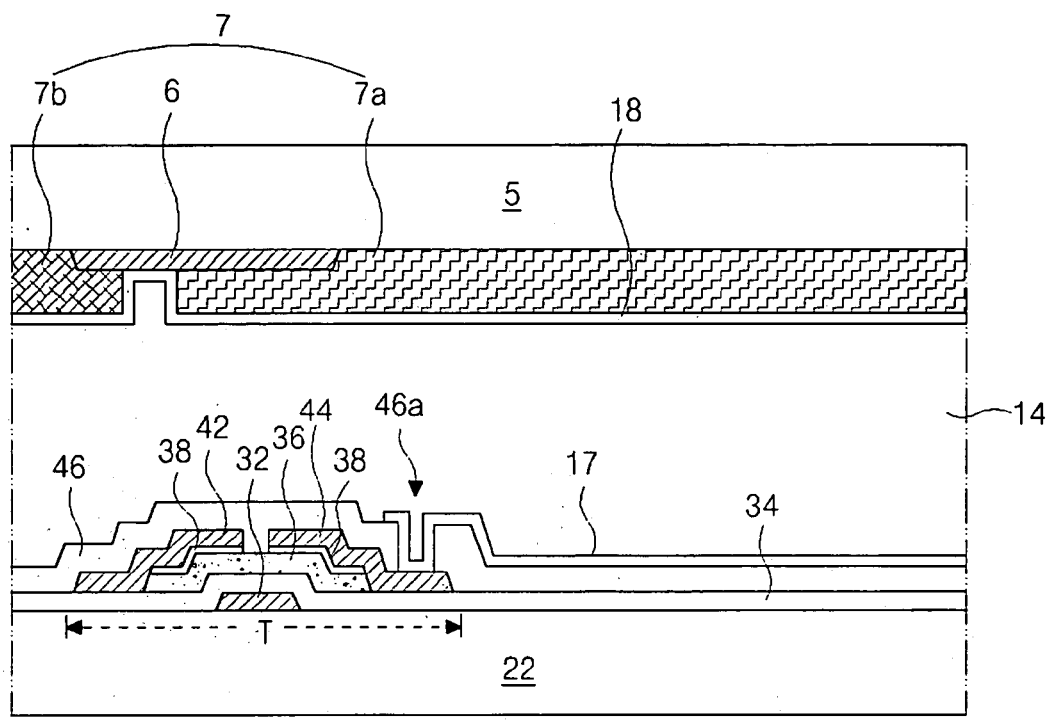
FIG. 2 is a schematic cross-sectional view of a liquid crystal display device according to the background art.
Figure 3:
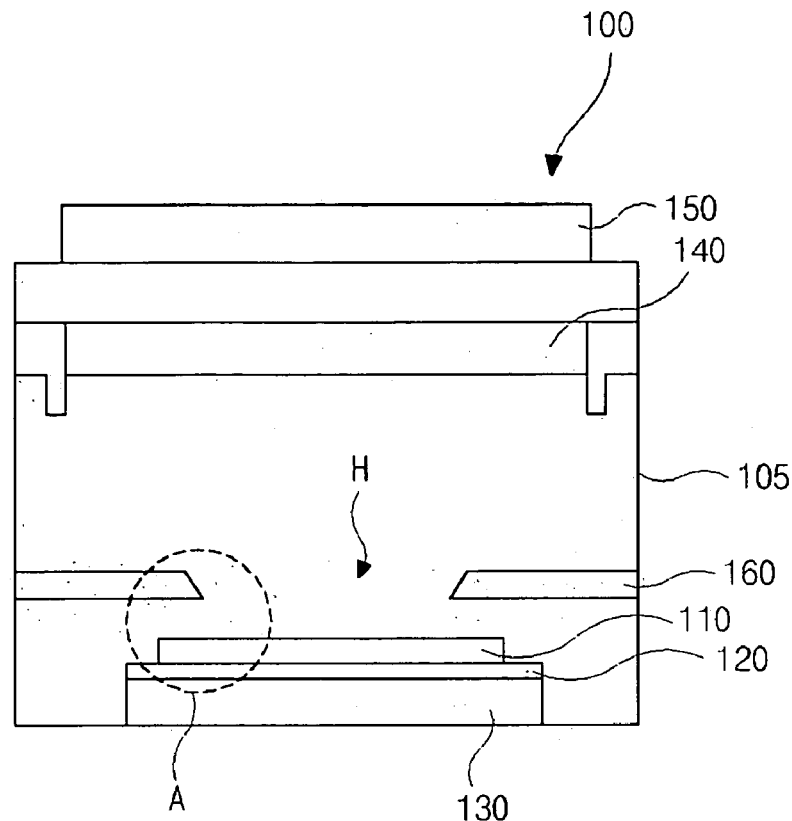
FIG. 3 is a schematic view showing a structure of a sputter according to the background art.
Figure 4:
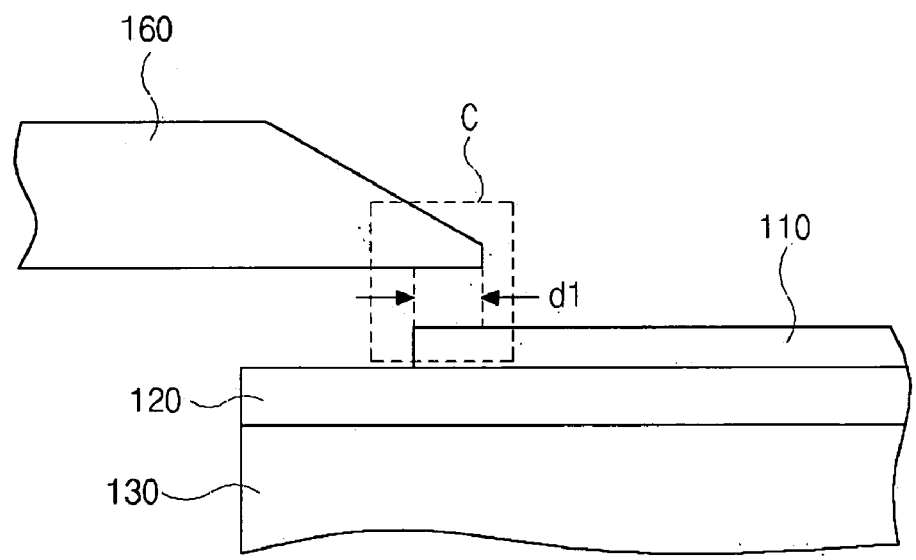
FIG. 4 is a magnified schematic view, which is a portion "A" of FIG. 3, showing a shield mask according to the background art.
Figure 5:
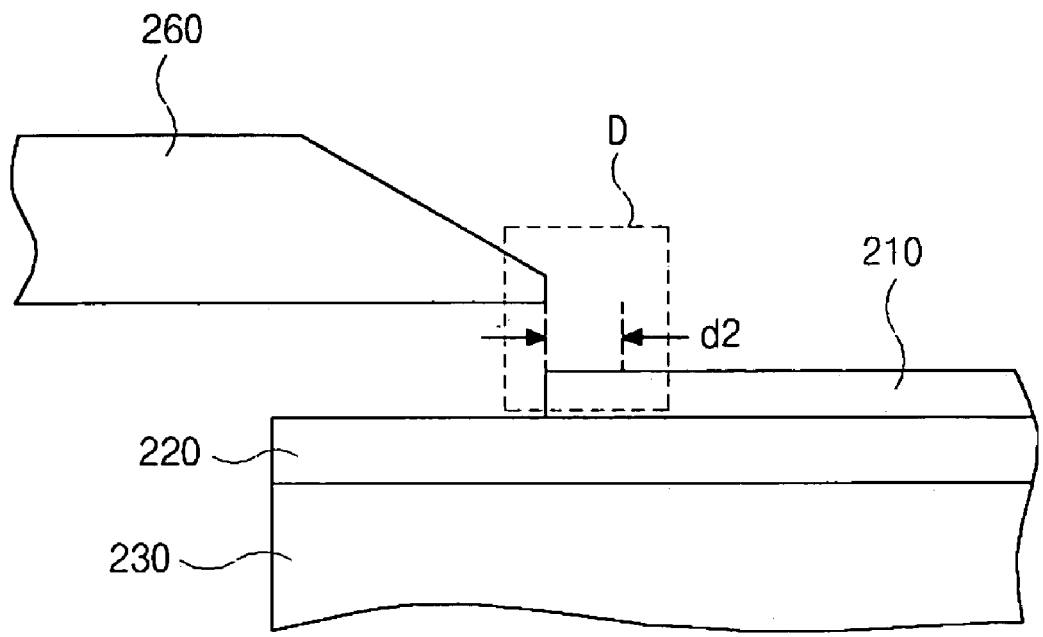
FIG. 5 is a schematic cross-sectional view showing a shield mask of a sputter according to an embodiment of the present invention.
Figure 6:
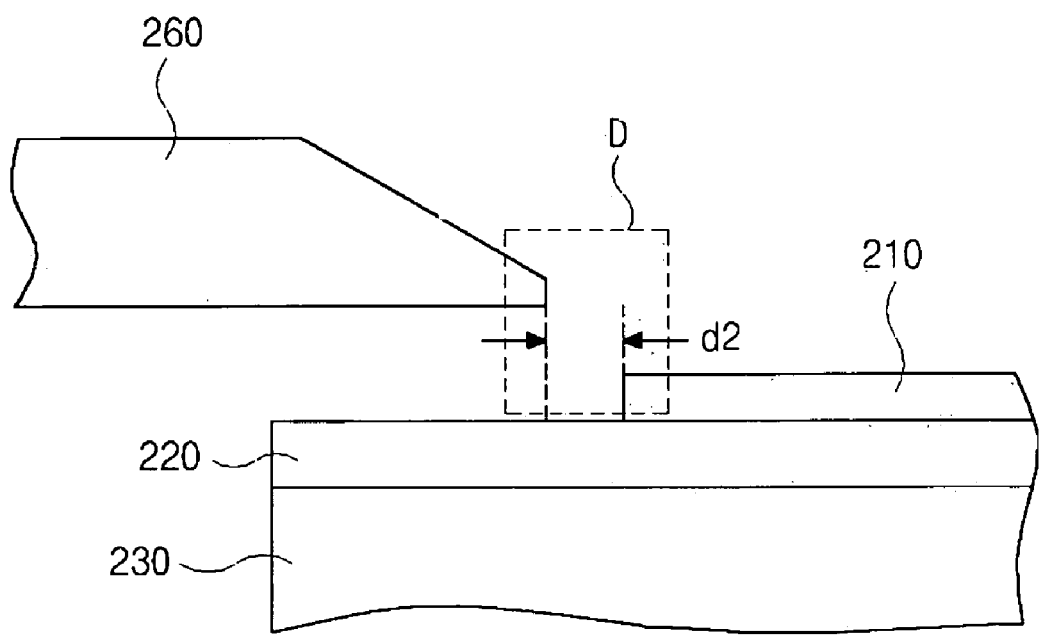
FIG. 6 is a further schematic cross-sectional view showing the shield mask of the present invention.

FIGS. 5 and 6 are schematic cross-sectional views showing a shield mask of a sputter according to an embodiment of the present invention.

In FIGS. 5 and 6, a substrate 210 is loaded on a susceptor 220. The susceptor 220 is formed on a platen 230. A shield mask 260 is located above the platen 230 at a distance spaced above the substrate 210. The shield mask 260 has an open portion having opening dimensions equal to (FIG. 5) or larger than (FIG. 6) dimensions of the substrate 210, so that the shield mask 260 does not overlap the substrate 210. Preferably, the shield mask 260 is spaced apart from the substrate 210 by a distance "d2" to form a separate portion "D." When the shield mask 260 has an open portion larger than or equal to the size of the substrate, a metal layer with uniform thickness may be formed by sputtering on an entire surface of the substrate 210. Accordingly, a number of array substrates or color filter substrates formed on one substrate increases, and utilization of the substrate 21 maximized.

A liquid crystal display (LCD) device includes a plurality of metal layers. For example, a gate line including a gate electrode, a data line including source and drain electrodes on the array substrate, and a black matrix on the color filter substrate, may be made of metallic materials by using a sputter. Moreover, a pixel electrode on the array substrate and a common electrode on the color filter layer may be made of transparent conductive materials by using a sputter. Therefore, these metallic layers may be formed by using the sputter including the shield mask of the present invention which is separated from the substrate. In general, aluminum (Al), aluminum neodymium (AlNd), chromium (Cr), copper (Cu), molybdenum (Mo), tungsten (W) and titanium (Ti) may be used for the gate line and the data line, and chromium (Cr) and chromium oxide (CrOx) may be used for the black matrix. Indium-tin-oxide (ITO) and indium-zinc-oxide (IZO) may be used for the pixel electrode and the common electrode.

When metal layers of an LCD device are formed on a substrate by using a sputter including the shield mask having an open portion larger than or equal to the size of the substrate, even an edge of the substrate, which cannot be used for the LCD device of the background art, can be utilized for the LCD device. Accordingly, more LCD panels can be obtained from one substrate, thereby reducing fabrication costs. Especially when an LCD panel having a relatively small area is fabricated, the number of LCD panels which may be obtained from one substrate is increased.

While the invention has been particularly shown and described with reference to an illustrated embodiment thereof, it will be understood by those skilled in the art that the foregoing and other changes in form and details may be made therein without departing from the spirit and scope of the invention.

What is claimed is:

1. A method of fabricating a liquid crystal display device, comprising the following steps:
    forming a gate line on a first substrate;
    forming a data line crossing the gate line;
    forming a switching element connected to the gate line and the data line;
    forming a pixel electrode connected to the switching element;
    forming a black matrix on a second substrate using a sputter, wherein the sputter includes a shield mask having an open portion having dimensions larger than size dimensions of the second substrate and includes a susceptor having an upper surface on which the second substrate is located, such that a portion of the upper surface of the susceptor not covered by the second substrate is partially exposed through the open portion;
    forming a color filter layer on the black matrix;
    forming a common electrode on the color filter layer;
    attaching the first and second substrates such that the pixel electrode faces the common electrode; and
    forming a liquid crystal layer between the pixel electrode and the common electrode.

2. The method of claim 1, wherein the black matrix includes chromium (Cr) and chromium oxide (CrOx).

3. The method of claim 2, wherein the gate line includes one of aluminum (Al), aluminum neodymium (AlNd), chromium (Cr), copper (Cu), molybdenum (Mo), tungsten (W) and titanium (Ti).

4. The method of claim 3, wherein the gate line is formed by using the sputter.

5. The method of claim 3, wherein the gate line is formed by using a second sputter, wherein the second sputter includes a second shield mask having an open portion having dimensions equal to size dimensions of the first substrate such that edges of the open portion of the second shield mask correspond to edges of the first substrate.

6. The method of claim 4, wherein the data line includes one of aluminum (Al), aluminum neodymium (AlNd), chromium (Cr), copper (Cu), molybdenum (Mo), tungsten (W) and titanium (Ti).

7. The method of claim 6, wherein the data line is formed by using the sputter.

8. The method of claim 6, wherein the data line is formed by using a second sputter, wherein the second sputter includes a second shield mask having an open portion having dimensions equal to the size dimensions of the first substrate such that edges of the open portion of the second shield mask correspond to edges of the first substrate.

9. The method of claim 7, wherein the pixel electrode includes one of indium-tin-oxide (ITO) and indium-zinc-oxide (IZO).

10. The method of claim 9, wherein the pixel electrode is formed by using the sputter.

11. The method of claim 9, wherein the pixel electrode is formed by using a second sputter, wherein the second sputter includes a second shield mask having an open portion having dimensions equal to the size dimensions of the first substrate such that edges of the open portion of the second shield mask correspond to edges of the first substrate.

12. The method of claim 10, wherein the common electrode includes one of indium-tin-oxide (ITO) and indium-zinc-oxide (IZO).

13. The method of claim 12, wherein the common electrode is formed by using the sputter.

14. The method of claim 12, wherein the common electrode is formed by using a second sputter, wherein the second sputter includes a second shield mask having an open portion having dimensions equal to the size dimensions of the second substrate such that edges of the open portion of the second shield mask correspond to edges of the second substrate.

15. The method of claim 1, wherein the portion of the upper surface the susceptor not covered by the second substrate is partially covered by the shield mask.

16. A sputter for a fabricating process of a liquid crystal display device, comprising:
    a chamber;
    a susceptor in the chamber, a substrate being loaded on an upper surface of the susceptor;
    a platen under the susceptor, the platen adjusting a height of the susceptor;
    a target over the susceptor;
    a magnet over the target; and
    a shield mask between the substrate and the target, the shield mask having an open portion having dimensions larger than size dimensions of the substrate such that a portion of the upper surface of the susceptor not covered by the substrate is partially exposed through the open portion.

17. The sputter of claim 16, wherein the target includes one of chromium (Cr), chromium oxide (CrOx), aluminum (Al), aluminum neodymium (AlNd), copper (Cu), molybdenum (Mo), tungsten (W), titanium (Ti), indium-tin-oxide (ITO) and indium-zinc-oxide (IZO).

18. The sputter of claim 16, wherein the portion of the upper surface the susceptor not covered by the substrate is partially covered by the shield mask.

19. A shield mask for a sputter including a chamber, a susceptor and a target in the chamber, wherein the shield mask is disposed between the target and a substrate loaded on an upper surface of the susceptor and has an open portion with dimensions larger than size dimensions of the substrate such that a portion of the upper surface of the susceptor not covered by the substrate is partially exposed through the open portion.

20. The shield mask of claim 19, wherein the portion of the upper surface the susceptor not covered by the substrate is partially covered by the shield mask.

21. A method of sputtering a metal layer onto a substrate, comprising the following steps:
   providing a sputtering chamber having a susceptor and a target therein;
   providing a shield between the susceptor and the target, the shield having an open portion therein;
   placing a substrate on an upper surface of the susceptor below the shield, the substrate having size dimensions smaller than size dimensions of the open portion of the shield such that a portion of the upper surface of the susceptor not covered by the substrate is partially exposed through the open portion; and
   sputtering a metal layer onto the substrate.

22. The method of claim 21, wherein the metal layer includes one of chromium (Cr), chromium oxide (CrOx), aluminum (Al), aluminum neodymium (AlNd), copper (Cu), molybdenum (Mo), tungsten (W), titanium (Ti), indium-tin-oxide (ITO) and indium-zinc-oxide (IZO).

23. The method of claim 21, wherein the metal layer is a gate line of a liquid crystal display device.

24. The method of claim 21, wherein the metal layer is a data line of a liquid crystal display device.

25. The method of claim 21, wherein the metal layer is a black matrix of a liquid crystal display device.

26. The method of claim 21, wherein the metal layer is a pixel electrode of a liquid crystal display device.

27. The method of claim 21, wherein the metal layer is a common electrode of a liquid crystal display device.

28. The method of claim 21, wherein the portion of the upper surface the susceptor not covered by the substrate is partially covered by the shield mask.

29. A method of fabricating a liquid crystal display device, comprising the following steps:
   forming a gate line on a first substrate;
   forming a data line crossing the gate line;
   forming a switching element connected to the gate line and the data line;
   forming a pixel electrode connected to the switching element;
   forming a black matrix on a second substrate using a sputter, wherein the sputter includes a shield mask having an open portion having dimensions equal to size dimensions of the second substrate such that edges of the open portion are aligned with edges of the second substrate;
   forming a color filter layer on the black matrix;
   forming a common electrode on the color filter layer;
   attaching the first and second substrates such that the pixel electrode faces the common electrode; and
   forming a liquid crystal layer between the pixel electrode and the common electrode.

30. The method of claim 29, wherein the edges of the open portion are vertically aligned with edges of the second substrate.

31. A sputter for a fabricating process of a liquid crystal display device, comprising:
   a chamber;
   a susceptor in the chamber, a substrate being loaded on the susceptor;
   a platen under the susceptor, the platen adjusting a height of the susceptor;
   a target over the susceptor;
   a magnet over the target; and
   a shield mask between the substrate and the target, the shield mask having an open portion having dimensions equal to size dimensions of the substrate such that edges of the open portion are aligned with edges of the substrate.

32. The sputter of claim 31, wherein the edges of the open portion are vertically aligned with edges of the substrate.

33. A shield mask for a sputter including a chamber, a susceptor and a target in the chamber, wherein the shield mask is disposed between the target and a substrate loaded on the susceptor and has an open portion with dimensions equal to size dimensions of the substrate such that edges of the open portion are aligned with edges of the substrate.

34. The shield mask of claim 33, wherein the edges of the open portion are vertically aligned with edges of the substrate.

35. A method of sputtering a metal layer onto a substrate, comprising the following steps:
   providing a sputtering chamber having a susceptor and a target therein;
   providing a shield between the susceptor and the target, the shield having an open portion therein;
   placing a substrate on the susceptor below the shield, the substrate having size dimensions equal to size dimensions of the substrate such that edges of the open portion are aligned with edges of the substrate; and
   sputtering a metal layer onto the substrate.

36. The method of claim 35, wherein the edges of the open portion are vertically aligned with edges of the substrate.

* * * * *